United States Patent
Nomura et al.

(10) Patent No.: US 11,136,743 B2
(45) Date of Patent: Oct. 5, 2021

(54) ELECTRIC CONSTRUCTION MACHINE

(71) Applicant: Hitachi Construction Machinery Tierra Co., Ltd., Koka (JP)

(72) Inventors: Takuya Nomura, Rittou (JP); Masayuki Yunoue, Koka (JP); Wataru Takagi, Kusatsu (JP); Hiromu Yukawa, Koka (JP); Yuki Yamamoto, Koka (JP)

(73) Assignee: Hitachi Construction Machinery Tierra Co., Ltd, Koka (JP)

( * ) Notice: Subject to any disclaimer, the term of this patent is extended or adjusted under 35 U.S.C. 154(b) by 33 days.

(21) Appl. No.: 16/645,345

(22) PCT Filed: Sep. 28, 2018

(86) PCT No.: PCT/JP2018/036518
§ 371 (c)(1),
(2) Date: Mar. 6, 2020

(87) PCT Pub. No.: WO2020/065996
PCT Pub. Date: Apr. 2, 2020

(65) Prior Publication Data
US 2021/0222399 A1   Jul. 22, 2021

(51) Int. Cl.
*E02F 9/20* (2006.01)
*B60L 50/60* (2019.01)
(Continued)

(52) U.S. Cl.
CPC ............ *E02F 9/2058* (2013.01); *B60L 50/60* (2019.02); *B60L 58/13* (2019.02); *E02F 9/2025* (2013.01);
(Continued)

(58) Field of Classification Search
CPC ......... E02F 9/2056; E02F 9/26; E02F 9/2025; E02F 9/22; E02F 9/2292; E02F 9/2285;
(Continued)

(56) References Cited

U.S. PATENT DOCUMENTS 5,995,886 A    11/1999  Tanaka et al.
9,109,347 B2*   8/2015  Gotou .................. E02F 9/2246
(Continued)

FOREIGN PATENT DOCUMENTS

EP    2 509 187 A1   10/2012
JP    10-77872 A      3/1998
(Continued)

OTHER PUBLICATIONS

English translation of document C1 (International Search Report (PCT/ISA/210) previously filed on Mar. 6, 2020) issued in PCT Application No. PCT/JP2018/036518 dated Dec. 25, 2018 (one (1) page).
(Continued)

*Primary Examiner* — Tyler J Lee
(74) *Attorney, Agent, or Firm* — Crowell & Moring LLP

(57) ABSTRACT

An electric construction machine that can travel from a work site to charging equipment and prevent the lowering of the work efficiency is provided. An electric hydraulic excavator includes a motor (28) that is driven by power of a battery device (19) and drives a hydraulic pump (29), a controller (37), and a display device (24). The controller (37) computes and stores the amount of consumed power of the motor (28) consumed during the period from the departure of the hydraulic excavator from the charging equipment to arrival at the work site, based on movement information of the hydraulic excavator acquired by a movement information acquiring device. The controller (37) subtracts the amount of consumed power from the amount of stored power of the battery device (19) to compute the amount of power consumable at the work site. The controller (37) computes the period of time for which operation is possible at the work site, based on the amount of power consumable at the work site, and causes the display device (24) to display the period of time for which operation is possible at the work site.

6 Claims, 8 Drawing Sheets

(51) Int. Cl.
*E02F 9/26* (2006.01)
*E02F 9/22* (2006.01)
*B60L 58/13* (2019.01)

(52) U.S. Cl.
CPC .............. *E02F 9/22* (2013.01); *E02F 9/26* (2013.01); *B60L 2200/40* (2013.01); *B60L 2240/62* (2013.01); *B60L 2240/80* (2013.01); *B60L 2250/16* (2013.01); *B60L 2260/54* (2013.01); *E02F 9/2285* (2013.01); *E02F 9/2292* (2013.01)

(58) Field of Classification Search
CPC ...... B60L 50/60; B60L 58/13; B60L 2240/80; B60L 2200/40; B60L 2260/54; B60L 2250/16; B60L 2240/62
See application file for complete search history.

(56) References Cited

U.S. PATENT DOCUMENTS

| | | | |
|---|---|---|---|
| 9,182,312 B2 * | 11/2015 | Kim | E02F 9/2075 |
| 9,340,953 B2 * | 5/2016 | Sakamoto | F02D 41/0205 |
| 9,822,510 B2 * | 11/2017 | Sakamoto | B60W 20/11 |
| 10,239,535 B2 * | 3/2019 | Yoo | B60W 30/1882 |

FOREIGN PATENT DOCUMENTS

| | | |
|---|---|---|
| JP | 2007-288894 A | 11/2007 |
| JP | 2008-18921 A | 8/2008 |
| JP | 2015-182857 A | 10/2015 |
| JP | 2017-46379 A | 3/2017 |
| WO | WO 2016/121243 A1 | 8/2016 |

OTHER PUBLICATIONS

International Search Report (PCT/ISA/210) issued in PCT Application No. PCT/JP2018/036518 dated Dec. 25, 2018 (three (3) pages).
Japanese-language Written Opinion (PCT/ISA/237) issued in PCT Application No. PCT/JP2018/036518 dated Dec. 25, 2018 (four (4) pages).
Extended European Search Report issued in European Application No. EP 18 93 2314 dated Mar. 23, 2021 (nine (9) pages).
International Preliminary Report on Patentability (PCT/IB/338 & PCT/IB/373) issued in PCT Application No. PCT/JP2018/036518 dated Apr. 8, 2021, including English translation of document C2 (Japanese-language Written Opinion (PCT/ISA/237) filed on Mar. 6, 2020 (seven (7) pages).

* cited by examiner

ELECTRIC CONSTRUCTION MACHINE

TECHNICAL FIELD

The present invention relates to an electric construction machine including a power storage device and a motor that is driven by power of the power storage device and drives a hydraulic pump.

BACKGROUND ART

Construction machines such as a hydraulic excavator include a hydraulic pump and plural hydraulic actuators (specifically, a hydraulic motor for travelling and a hydraulic motor for work) driven by hydraulic fluid delivered from the hydraulic pump. Engine-driven construction machines include a fuel tank that stores fuel and an engine driven by the fuel of the fuel tank and are configured to drive the hydraulic pump by the engine. With respect to the engine-driven construction machines, a construction machine that computes the operable time of the construction machine (in other words, drivable time of the engine), based on the fuel amount of the fuel tank, and displays the computed operable time is known (for example, refer to Patent Document 1).

PRIOR ART DOCUMENT

Patent Document

Patent Document 1: JP-10-077872-A

SUMMARY OF THE INVENTION

Problem to be Solved by the Invention

In recent years, an electric construction machine that includes a power storage device and a motor driven by power of the power storage device and is configured to drive a hydraulic pump by the motor has been proposed. The electric construction machine must go back and forth between charging equipment for charging the power storage device and a work site in some cases. Specifically, for example, even when movable charging equipment is prepared, this charging equipment cannot come close to a work site in some cases. Alternatively, for example, fixed charging equipment is distant from a work site in other cases. In such a case, the electric construction machine travels to the work site after charging the power storage device by the charging equipment and operates at the work site. Then, when the amount of stored power of the power storage device becomes small, the electric construction machine must return from the work site to the charging equipment. For this reason, the amount of stored power of the power storage device for allowing the construction machine to travel from the work site to the charging equipment needs to be secured and the operating time of the construction machine (in other words, driving time of the motor) at the work site needs to be limited.

As such, for example, a method in which the average power consumption per unit time is computed based on the amount of consumed power of the motor consumed when the construction machine is operated at the work site and the amount of stored power of the power storage device is divided by the average power consumption to compute the operable time of the construction machine and to display the computed operable time may be conceived. However, in general, the load of the hydraulic motor for travelling is higher compared with the load of the hydraulic actuator for work. Thus, the amount of consumed power of the motor consumed at the time of travelling of the construction machine is larger compared with the amount of consumed power of the motor consumed at the time of work of the construction machine. For such a reason, with respect to the operable time computed and displayed by the above-described method, the operator must estimate a longer time as the operable time corresponding to the necessary amount of stored power of the power storage device for the construction machine to travel from the work site to the charging equipment. Then, if the estimate of the operable time by the operator is not sufficient, the construction machine cannot travel from the work site to the charging equipment. Meanwhile, if the estimate of the operable time by the operator is larger than necessary, the work efficiency of the construction machine is reduced.

The present invention is made in view of the above-described matter and an object thereof is to provide an electric construction machine that can travel from a work site to charging equipment and prevent the lowering of the work efficiency.

Means for Solving the Problem

In order to achieve the above-described object, the present invention provides an electric construction machine including a power storage device, a motor driven by power of the power storage device, a hydraulic pump driven by the motor, a hydraulic motor for travelling and a hydraulic actuator for work that are driven by hydraulic fluid delivered from the hydraulic pump, a controller, and a display device. The electric construction machine further includes a movement information acquiring device that acquires movement information of the construction machine. The controller computes and stores the amount of consumed power of the motor consumed during a period from the departure of the construction machine from charging equipment to arrival at a work site, based on the movement information of the construction machine acquired by the movement information acquiring device. The controller subtracts the amount of consumed power from the amount of stored power of the power storage device to compute the amount of power consumable at the work site. The controller computes the period of time for which operation is possible at the work site, based on the amount of power consumable at the work site, and causes the display device to display the period of time for which operation is possible at the work site.

Advantages of the Invention

According to the present invention, the electric construction machine can travel from the work site to the charging equipment and the lowering of the work efficiency of the electric construction machine can be prevented.

MODES FOR CARRYING OUT THE INVENTION

One embodiment of the present invention will be described below with reference to the drawings by taking an electric hydraulic excavator as an example of an application target of the present invention.

Figure 1:
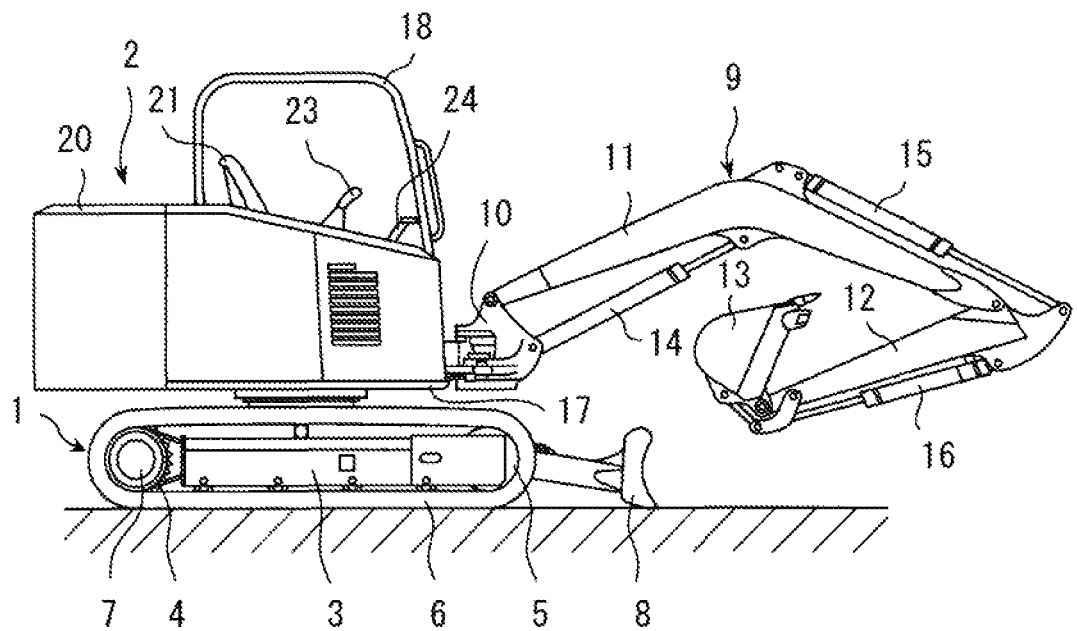
FIG. 1 is a side view that represents the structure of an electric hydraulic excavator in one embodiment of the present invention.
Figure 2:
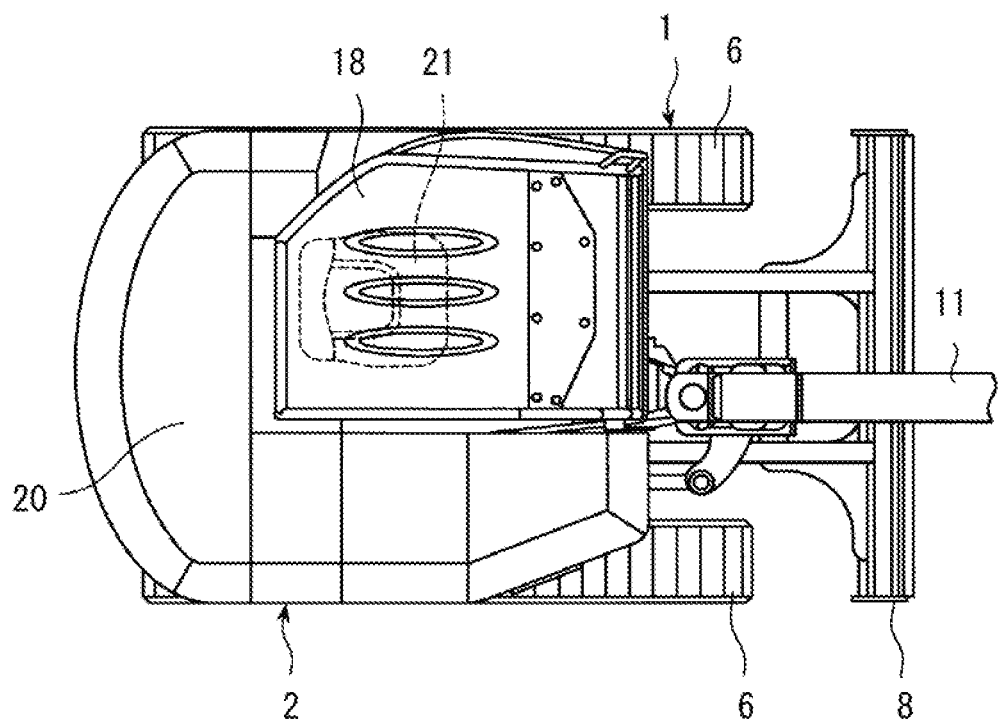
FIG. 2 is a top view that represents the structure of the electric hydraulic excavator in the one embodiment of the present invention.

FIG. 1 and FIG. 2 are side view and top view that represent the structure of the electric hydraulic excavator in the present embodiment. Note that, hereinafter, the front side (right side in FIG. 1 and FIG. 2), the rear side (left side in FIG. 1 and FIG. 2), the right side (lower side in FIG. 2), and the left side (upper side in FIG. 2) of an operator when the operator sits on an operation seat with the electric hydraulic excavator being in the state illustrated in FIG. 1 and FIG. 2 will simply be referred to as the front side, the rear side, the right side, and the left side.

The electric hydraulic excavator of the present embodiment is a mini-excavator with machine mass lower than 6,000 kg. This electric hydraulic excavator includes a self-propelled lower track structure 1 and an upper swing structure 2 swingably disposed on the upper side of the lower track structure 1, and the lower track structure 1 and the upper swing structure 2 configure a machine body. The upper swing structure 2 swings by a hydraulic motor for swing (not depicted).

The lower track structure 1 includes a track frame 3 having an H shape as viewed from the upper side. A drive wheel 4 and an idler wheel 5 are disposed on the right side of the track frame 3, and a right crawler 6 is wrapped between them. The right drive wheel 4 rotates by a hydraulic motor 7 for travelling, on the right side, and thereby, the right crawler 6 is driven. A drive wheel and an idler wheel are disposed also on the left side of the track frame 3, and the left crawler 6 is wrapped between them. The left drive wheel rotates by a hydraulic motor for travelling, on the left side (not depicted), and thereby, the left crawler 6 is driven.

A blade 8 for earth removal is disposed on the front side of the track frame 3 vertically movably. The blade 8 vertically moves by a hydraulic cylinder for the blade (not depicted).

A work device 9 is joined to the front side of the upper swing structure 2. The work device 9 includes a swing post 10 joined to the front side of the upper swing structure 2 (specifically, swing frame 17 to be described later) pivotally in the left-right direction, a boom 11 joined to the swing post 10 pivotally in the upward-downward direction, an arm 12 joined to the boom 11 pivotally in the upward-downward direction, and a bucket 13 joined to the arm 12 pivotally in the upward-downward direction. The swing post 10, the boom 11, the arm 12, and the bucket 13 are made to pivot by a hydraulic cylinder for the swing (not depicted), a hydraulic cylinder 14 for the boom, a hydraulic cylinder 15 for the arm, and a hydraulic cylinder 16 for the bucket, respectively.

The upper swing structure 2 includes the swing frame 17 that forms a basic structural body, a canopy-type operation room 18 disposed on the left side of the swing frame 17, and a battery-mounted part 20 that is disposed on the rear side of the swing frame 17 and houses a battery device 19 (see FIG. 3 and FIG. 4 to be described later).

In the operation room 18, an operation seat 21 on which an operator sits is disposed. On the front side of the operation seat 21, an operation member 22 for travelling, on the right side (see FIG. 3 to be described later), and an operation member for travelling, on the left side (not depicted), are disposed. The operation member for travelling is what is obtained by integrating an operation pedal and an operation lever and gives an instruction on travelling operation of the lower track structure 1 when operated in the front-rear direction. An operation pedal for the swing (not depicted) is disposed on the right side of the operation member 22 for travelling. The operation pedal for the swing gives an instruction on operation of the swing post 10 when operated in the left-right direction.

An operation lever 23 for work and an operation lever for the blade (not depicted) are disposed on the right side of the operation seat 21. The operation lever 23 for work, on the right side, gives an instruction on operation of the boom 11 when operated in the front-rear direction and gives an instruction on operation of the bucket 13 when operated in the left-right direction. The operation lever for the blade gives an instruction on operation of the blade 8 when operated in the front-rear direction. An operation lever for work (not depicted) is disposed on the left side of the operation seat 21. The operation lever for work, on the left side, gives an instruction on operation of the arm 12 when operated in the front-rear direction and gives an instruction on swing operation of the upper swing structure 2 when operated in the left-right direction.

In the operation room 18, a display device 24, a start-stop switch 25 (see FIG. 4 to be described later), and a release switch 26 (see FIG. 4 to be described later) are disposed.

The above-described lower track structure 1, upper swing structure 2, blade 8, swing post 10, boom 11, arm 12, and bucket 13 configure a driven body driven by a drive system mounted on the electric hydraulic excavator. FIG. 3 is a diagram that represents a configuration relating to driving of the hydraulic motor 7 for travelling, on the right side, as a representative of the hydraulic motor for travelling and a configuration relating to driving of the hydraulic cylinder 14 for the boom as a representative of the hydraulic actuator for work, in the configuration of the drive system in the present embodiment.

The drive system of the present embodiment includes the battery device 19 (power storage device), a motor 28 that is driven by being supplied with power of the battery device 19 through an inverter device 27, a hydraulic pump 29 and a pilot pump 30 that are driven by the motor 28, a control valve 31 for travelling that controls the flow of hydraulic fluid from the hydraulic pump 29 to the hydraulic motor 7 for travelling, an operation device 32 for travelling that switches the control valve 31 for travelling, a control valve 33 for the boom that controls the flow of the hydraulic fluid from the hydraulic pump 29 to the hydraulic cylinder 14 for the boom, and an operation device 34 for work that switches the control valve 33 for the boom.

The operation device 32 for travelling includes the above-described operation member 22 for travelling, a first pressure reducing valve (not depicted) actuated in response to forward operation of the operation member 22 for travelling, and a second pressure reducing valve (not depicted) actuated in response to rearward operation of the operation member 22 for travelling. The first pressure reducing valve employs the delivery pressure of the pilot pump 30 as the source pressure to generate a pilot pressure corresponding to the amount of forward operation of the operation member 22 for travelling and to output the generated pilot pressure to a pressure receiving part of the control valve 31 for travelling, on the right side in FIG. 3, through a pilot line. The control valve 31 for travelling is thereby switched to a switching position on the right side in FIG. 3, and the hydraulic motor 7 for travelling is rotated in the forward direction.

Figure 3:
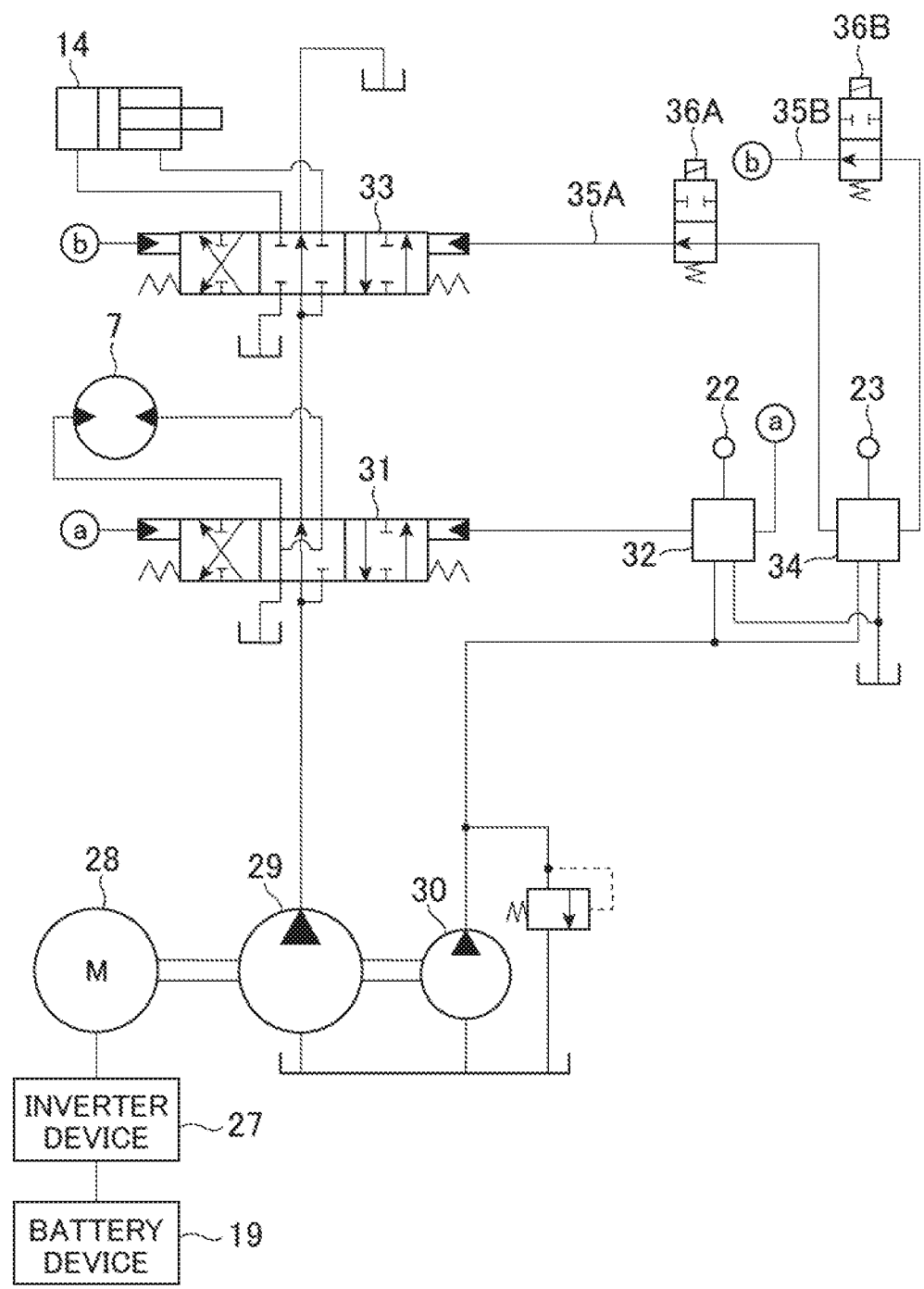
FIG. 3 is a diagram that represents the configuration of a drive system in the one embodiment of the present invention.
Figure 4:
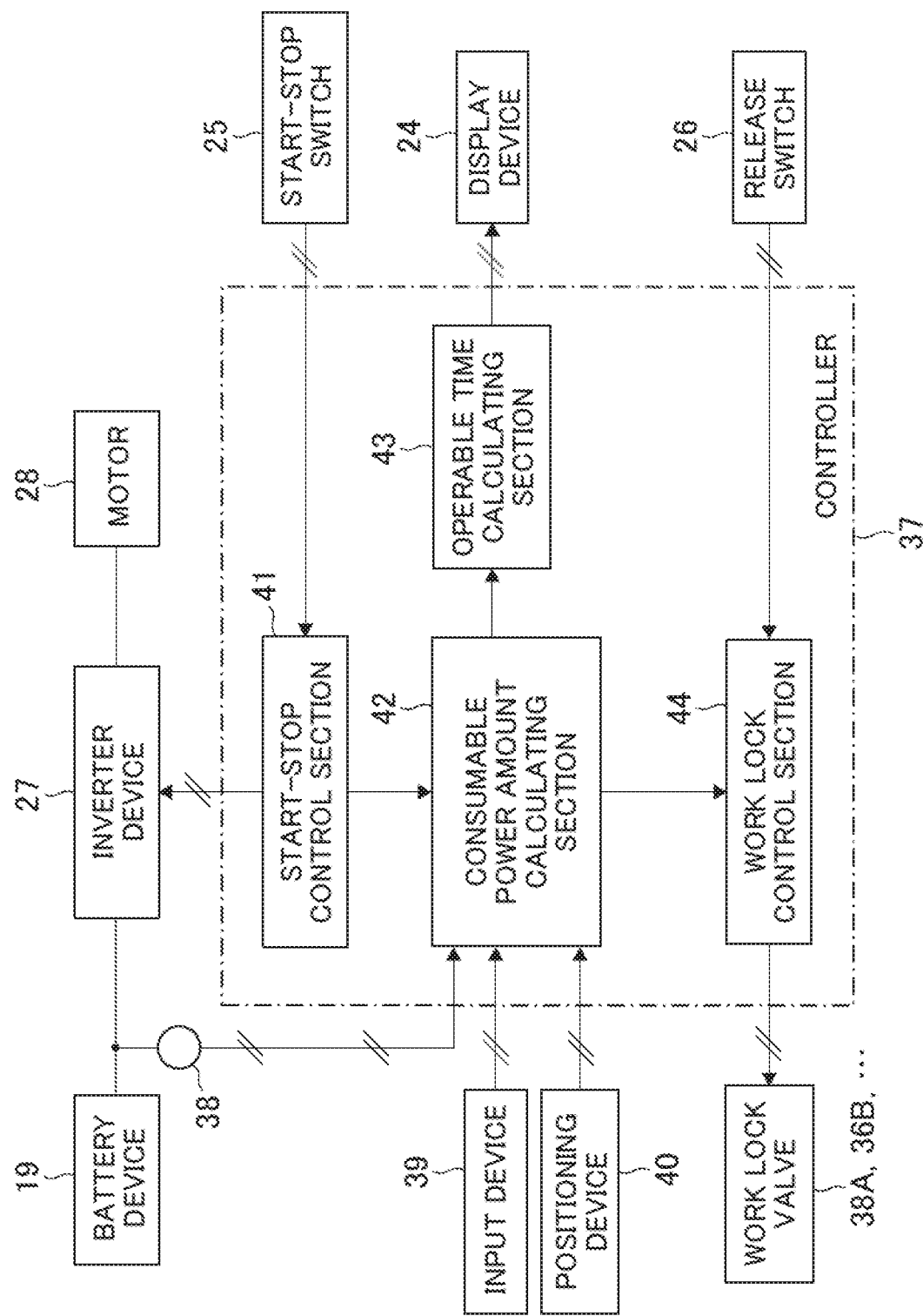
FIG. 4 is a diagram that represents the functional configuration of a controller in the one embodiment of the present invention together with related instruments.

The second pressure reducing valve employs the delivery pressure of the pilot pump 30 as the source pressure to generate a pilot pressure corresponding to the amount of rearward operation of the operation member 22 for travelling and to output the generated pilot pressure to a pressure receiving part of the control valve 31 for travelling, on the left side in FIG. 3, through a pilot line. The control valve 31 for travelling is thereby switched to a switching position on the left side in FIG. 3, and the hydraulic motor 7 for travelling is rotated in the rearward direction.

The operation device 34 for work includes the above-described operation lever 23 for work, a third pressure reducing valve (not depicted) actuated in response to forward operation of the operation lever 23 for work, and a fourth pressure reducing valve (not depicted) actuated in response to rearward operation of the operation lever 23 for work. The third pressure reducing valve employs the delivery pressure of the pilot pump 30 as the source pressure to generate a pilot pressure corresponding to the amount of forward operation of the operation lever 23 for work and to output the generated pilot pressure to a pressure receiving part of the control valve 33 for the boom, on the right side in FIG. 3, through a pilot line 35A. The control valve 33 for the boom is thereby switched to a switching position on the right side in FIG. 3, and the hydraulic cylinder 14 for the boom is contracted.

The fourth pressure reducing valve employs the delivery pressure of the pilot pump 30 as the source pressure to generate a pilot pressure corresponding to the amount of rearward operation of the operation lever 23 for work and to output the generated pilot pressure to a pressure receiving part of the control valve 33 for the boom, on the left side in FIG. 3, through a pilot line 35B. The control valve 33 for the boom is thereby switched to a switching position on the left side in FIG. 3, and the hydraulic cylinder for the boom is expanded.

Note that the configuration relating to driving of the hydraulic motor for travelling, on the left side, and the other hydraulic actuators for work (specifically, the hydraulic motor for swing, the hydraulic cylinder for the blade, the hydraulic cylinder for the swing, the hydraulic cylinder 15 for the arm, and the hydraulic cylinder 16 for the bucket) is almost the same as the configuration relating to the driving of the hydraulic motor 7 for travelling, on the right side, and the hydraulic cylinder 14 for the boom. Work lock valves 36A and 36B are respectively disposed for the pilot lines 35A and 35B relating to the driving of the hydraulic cylinder 14 for the boom. Plural work lock valves are disposed also for plural pilot lines relating to the driving of the other hydraulic actuators for work although not illustrated in the diagram.

The work lock valves 36A and 36B and the plural work lock valves (hereinafter, referred to as the work lock valves 36A, 36B, and so forth) are switched between a communication position and an interruption position by control of a controller 37 to be described later. When the work lock valves 36A, 36B, and so forth are at the communication position, the pilot pressure generated by the operation device is input to the pressure receiving part of the control valve. Therefore, driving of all hydraulic actuators for work is permitted. On the other hand, when the work lock valves 36A, 36B, and so forth are at the interruption position, the pilot pressure generated by the operation device is not input to the pressure receiving part of the control valve. Therefore, driving of all hydraulic actuators for work (in other words, operation other than travelling) is prohibited.

Incidentally, the above-described electric hydraulic excavator must go back and force between charging equipment for charging the battery device 19 and a work site in some cases. The electric hydraulic excavator of the present embodiment includes the controller 37. The controller 37 computes the period of time for which the hydraulic excavator can operate at the work site and causes the display device 24 to display the period of time. Furthermore, the controller 37 computes the amount of stored power of the battery device 19 and causes the display device 24 to display the amount of stored power. In addition, when the amount of stored power of the battery device 19 has decreased to a threshold, the controller 37 controls the work lock valves 36A, 36B, and so forth to the communication position to prohibit driving of all hydraulic actuators for work. The controller 37 of the present embodiment and related instruments will be described by using FIG. 4. FIG. 4 is a diagram that represents the functional configuration of the controller in the present embodiment together with the related instruments.

The electric hydraulic excavator of the present embodiment includes an input device 39 and a positioning device 40, as a movement information acquiring device that acquires movement information of the hydraulic excavator. The input device 39 is a device for inputting the locations (specifically, information on the latitude and the longitude) of charging equipment and work site. For example, the input device 39 includes a display that displays a map, an operation button to move a cursor on the map, an operation button to indicate the position of the cursor on the map as the location of the charging equipment or work site, and a controller that outputs the indicated positions of the charging equipment and the work site to the controller 37. Note that the input device 39 may be configured as one function of the display device 24. The positioning device 40 measures the location of the hydraulic excavator (self-machine) based on signals from satellites that are not depicted in the diagram and outputs the measured location of the hydraulic excavator to the controller 37.

A current sensor 38 is disposed between the battery device 19 and the inverter device 27 and the supply current of the battery device 19 (in other words, current consumption of the motor 28) sensed by the current sensor 38 is output to the controller 37. The start-stop switch 25 includes, for example, a push switch and inputs an instruction for starting or stopping the motor 28. The release switch 26 includes, for example, a push switch and inputs an instruction for removing the prohibition of driving of the hydraulic actuators for work.

The controller 37 has a calculation control section (for example, a CPU) that executes calculation processing and control processing based on a program, a storing section (for example, a ROM and a RAM) that stores the program and the result of calculation processing, and so forth. The controller 37 has a start-stop control section 41, a consumable power amount calculating section 42, an operable time calculating section 43, and a work lock control section 44, as a functional configuration.

The start-stop control section 41 of the controller 37 controls the inverter device 27 in response to input by the start-stop switch 25 and thereby controls start and stop of the motor 28.

The consumable power amount calculating section 42 of the controller 37 stores the locations of the charging equipment and the work site input from the input device 39 and acquires the timing when the hydraulic excavator departs from the charging equipment and the timing when the hydraulic excavator arrives at the work site, based on these locations and the location of the hydraulic excavator measured by the positioning device 40 (in other words, based on the movement information of the hydraulic excavator acquired by the movement information acquiring device). Then, the consumable power amount calculating section 42 accumulates the current consumption of the motor 28 sensed by the current sensor 38 during the period from the departure of the hydraulic excavator from the charging equipment to the arrival at the work site to compute the amount of consumed power of the motor 28 and to store the computed amount of consumed power (first processing).

The consumable power amount calculating section 42 of the controller 37 subtracts the above-described amount of consumed power from the amount of stored power of the battery device 19 to compute the amount of power consumable at the work site (second processing). The operable time calculating section 43 of the controller 37 computes the period of time for which operation is possible at the work site, based on the amount of power consumable at the work site computed by the consumable power amount calculating section 42 (third processing).

The work lock control section 44 of the controller 37 sets a threshold of the amount of stored power in such a manner that the threshold is larger than the above-described amount of consumed power by a predetermined value set in advance, and controls the work lock valves 36A, 36B, and so forth to the interruption position to prohibit driving of all hydraulic actuators for work when the amount of stored power of the battery device 19 has decreased to the threshold (fourth processing). When an instruction from the release switch 26 is input, the work lock control section 44 controls the work lock valves 36A, 36B, and so forth to the communication position to remove the prohibition of driving of all hydraulic actuators for work (fifth processing).

Figure 5:
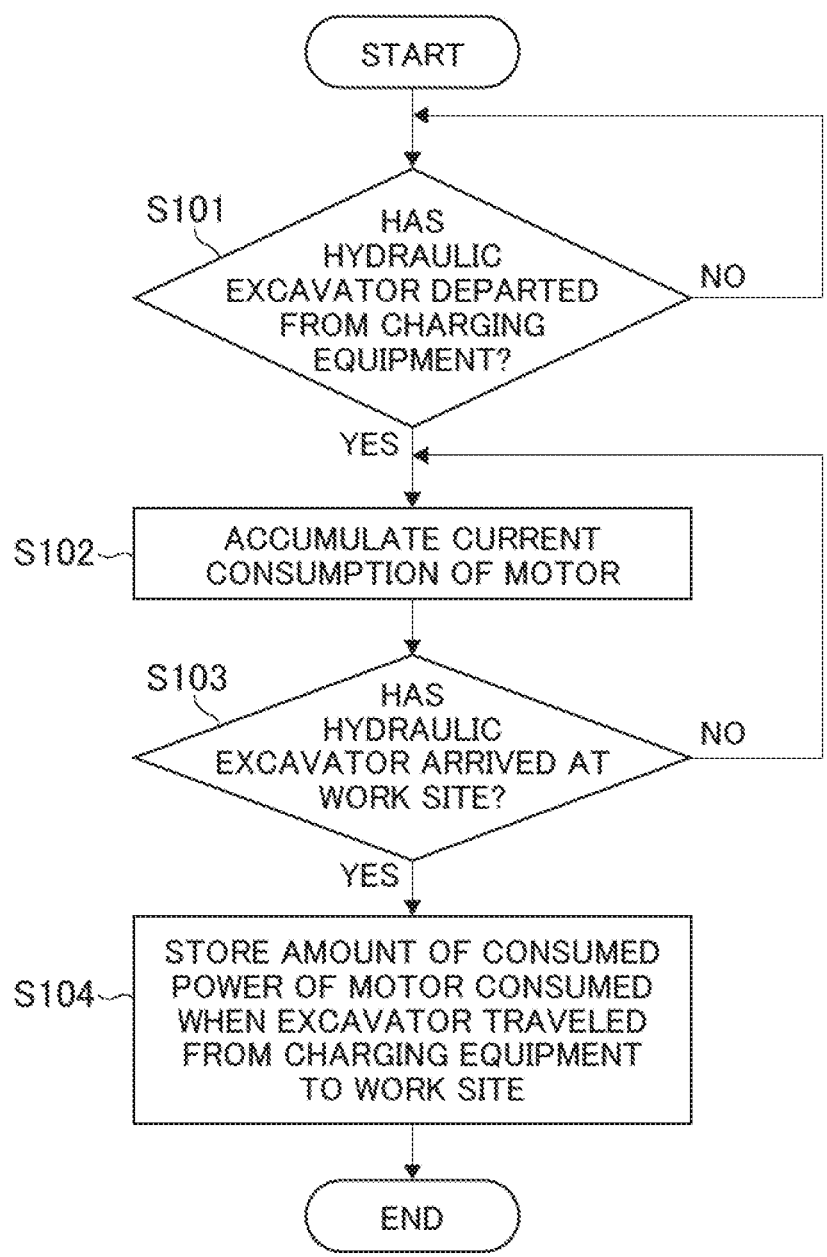
FIG. 5 is a flowchart that represents first processing of the controller in the one embodiment of the present invention.

Next, each kind of processing of the controller 37 of the present embodiment will be described. FIG. 5 is a flowchart that represents the first processing of the controller in the present embodiment.

In step S101, the consumable power amount calculating section 42 of the controller 37 determines whether the hydraulic excavator has departed from charging equipment based on the stored location of the charging equipment and the location of the hydraulic excavator measured by the positioning device 40. Specifically, the consumable power amount calculating section 42 determines that the hydraulic excavator has departed from the charging equipment when the location of the hydraulic excavator measured by the positioning device 40 is away from the location of the charging equipment. When determining that the hydraulic excavator has departed from the charging equipment, the consumable power amount calculating section 42 proceeds to step S102 and starts accumulation of the current consumption of the motor 28 sensed by the current sensor 38.

Then, the processing sequence proceeds to step S103, and the consumable power amount calculating section 42 of the controller 37 determines whether the hydraulic excavator has arrived at a work site, based on the stored location of the work site and the location of the hydraulic excavator measured by the positioning device 40. Specifically, the consumable power amount calculating section 42 determines that the hydraulic excavator has arrived at the work site when the location of the hydraulic excavator measured by the positioning device 40 overlaps with the location of the work site. The consumable power amount calculating section 42 continues the accumulation of the current consumption in step S102 until determining that the hydraulic excavator has arrived at the work site. The consumable power amount calculating section 42 ends the accumulation of the current consumption in step S102 when determining that the hydraulic excavator has arrived at the work site. The amount of consumed power of the motor 28 consumed during the period from the departure of the hydraulic excavator from the charging equipment to the arrival at the work site is thereby computed.

Then, the processing sequence proceeds to step S104, and the consumable power amount calculating section 42 of the controller 37 stores the computed amount of consumed power of the motor 28.

Figure 6:
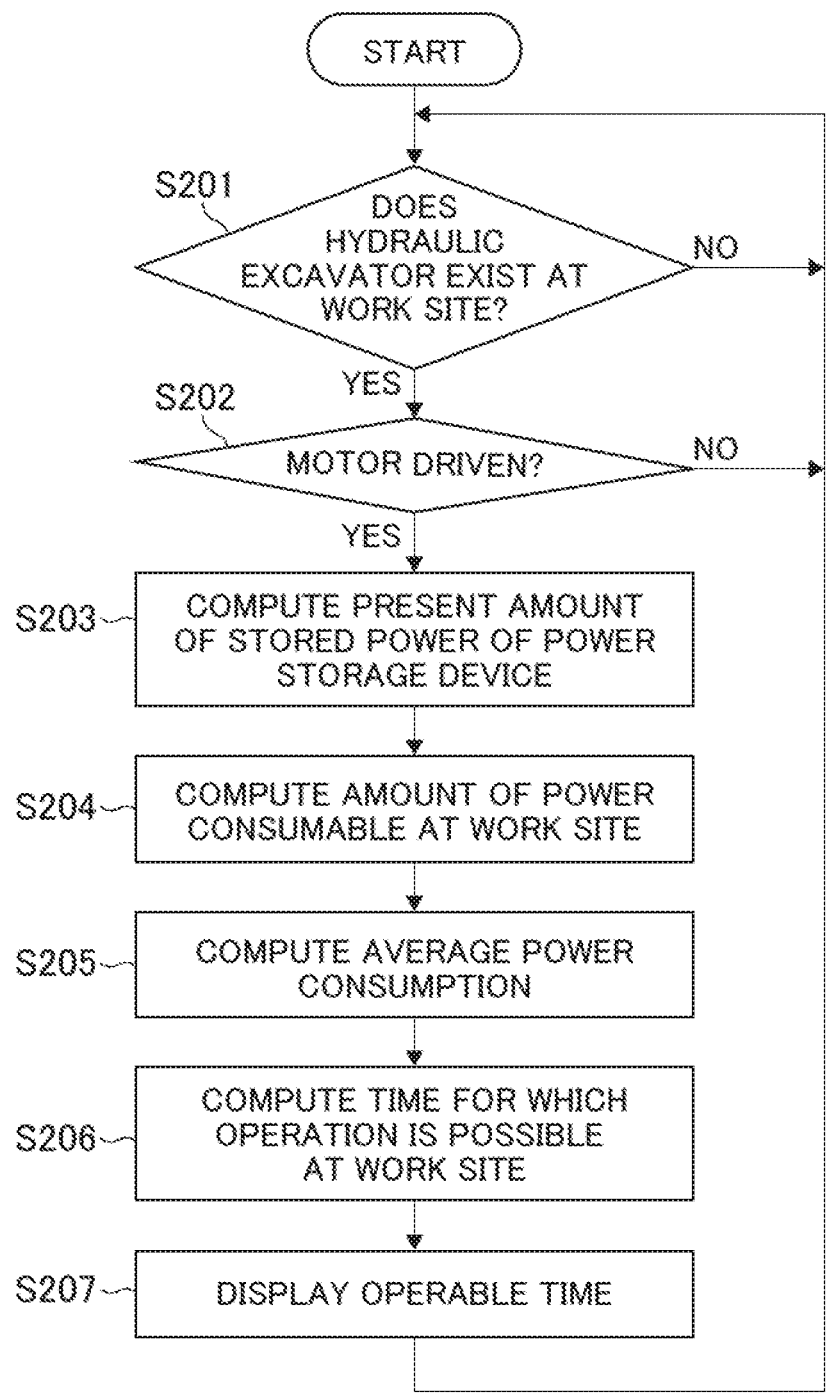
FIG. 6 is a flowchart that represents second processing and third processing of the controller in the one embodiment of the present invention.

FIG. 6 is a flowchart that represents the second processing and the third processing of the controller in the present embodiment.

In step S201, the consumable power amount calculating section 42 of the controller 37 determines whether the hydraulic excavator is present at the work site, based on the stored location of the work site and the location of the hydraulic excavator measured by the positioning device 40. Then, when determining that the hydraulic excavator is present at the work site, the consumable power amount calculating section 42 proceeds to step S202 and determines whether the motor 28 is being driven (in other words, whether the hydraulic excavator is operating) based on control information of the start-stop control section 41. When the motor 28 is not being driven, the consumable power amount calculating section 42 returns to step S201 described above. On the other hand, when the motor 28 is being driven, the consumable power amount calculating section 42 proceeds to step S203.

Figure 7:
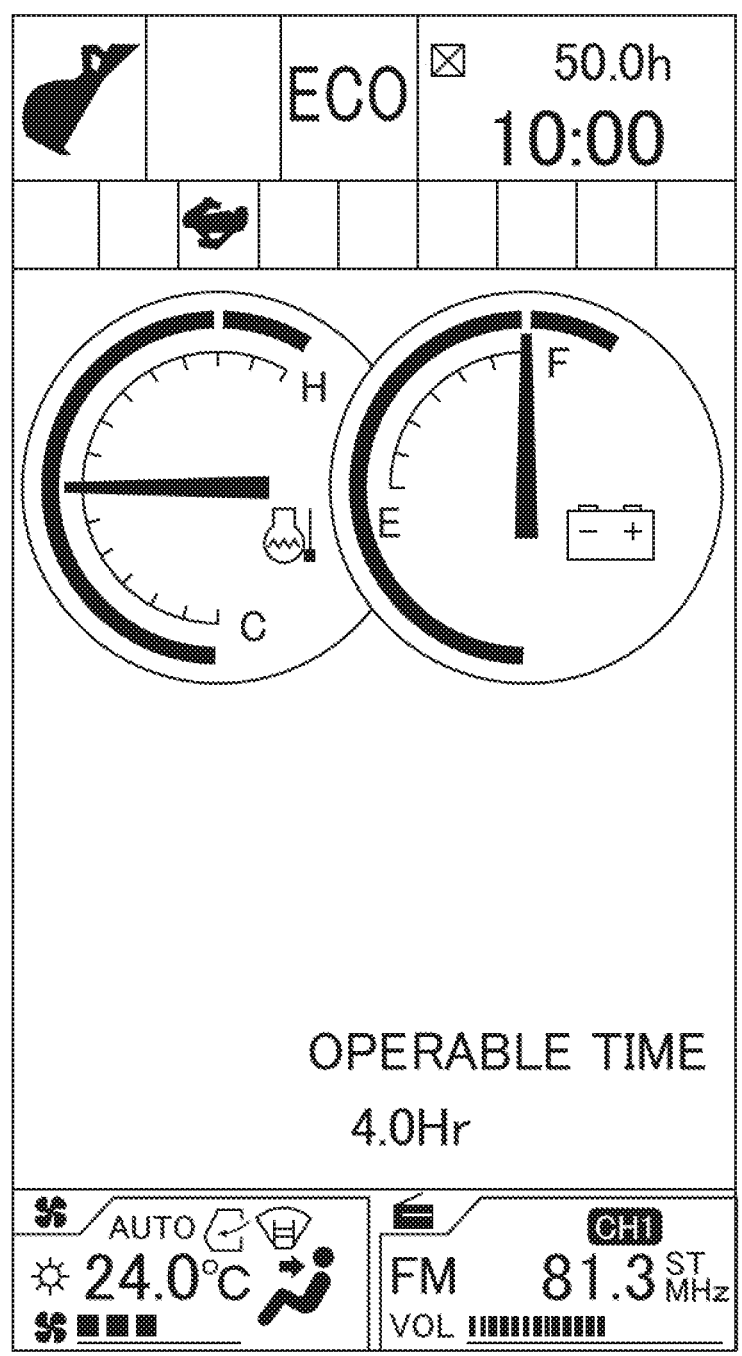
FIG. 7 is a diagram that represents a specific example of a screen of a display device in the one embodiment of the present invention.

In step S203, the consumable power amount calculating section 42 of the controller 37 computes the present amount of stored power of the battery device 19. Specifically, the consumable power amount calculating section 42 accumulates the current consumption of the motor 28 sensed by the current sensor 38 and computes the amount of consumed power of the motor 28, at every predetermined time interval. Then, the consumable power amount calculating section 42 subtracts the above-described amount of consumed power from the amount of stored power of the battery device 19 in the past (that is an amount before elapse of the predetermined time) to compute the present amount of stored power. Then, the consumable power amount calculating section 42 outputs the computed present amount of stored power of the battery device 19 to the display device 24 and causes the display device 24 to display the present amount of stored power. The display device 24 displays the amount of stored power, based on the position of a needle among scale marks as depicted in FIG. 7, for example.

Then, the processing sequence proceeds to step S204, and the consumable power amount calculating section 42 of the controller 37 subtracts the amount of consumed power stored in step S104 in the above-described FIG. 5 from the present amount of stored power of the battery device 19 computed in step S203 described above to compute the amount of power consumable at the work site.

In step S205, the operable time calculating section 43 of the controller 37 computes the average power consumption per unit time, based on the amount of consumed power of the motor 28 consumed when the hydraulic excavator is operated at the work site. Then, the processing sequence proceeds to step S206, and the operable time calculating section 43 divides the amount of power consumable at the work site computed by the consumable power amount calculating section 42 by the above-described average power consumption to compute the period of time for which operation is possible at the work site. Then, the processing sequence proceeds to step S207, and the operable time calculating section 43 outputs the computed operable time to the display device 24 and causes the display device 24 to display the operable time. The display device 24 displays the operable period of time (numerical value) as depicted in FIG. 7, for example.

Figure 8:
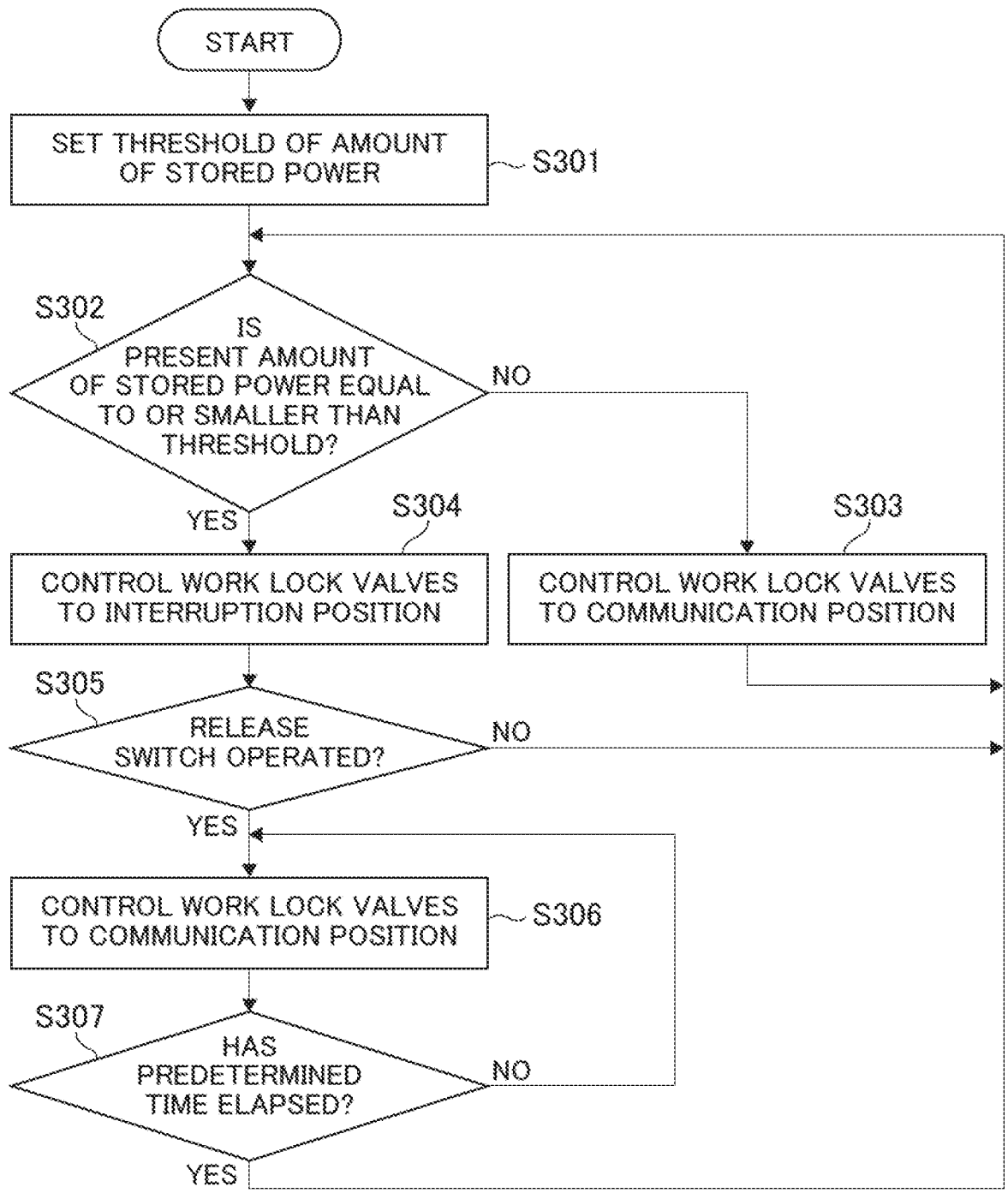
FIG. 8 is a flowchart that represents fourth processing and fifth processing of the controller in the one embodiment of the present invention.

FIG. 8 is a flowchart that represents the fourth processing and the fifth processing of the controller in the present embodiment.

In step S301, the work lock control section 44 of the controller 37 sets a threshold of the amount of stored power in such a manner that the threshold is larger than the amount of consumed power stored in step S104 in the above-described FIG. 5 only by a predetermined value set in advance. Then, the processing sequence proceeds to step S302, and the work lock control section 44 determines whether the present amount of stored power of the battery device 19 computed in step S203 in the above-described FIG. 5 has decreased to the threshold. When the present amount of stored power of the battery device 19 exceeds the threshold, the processing sequence proceeds to step S303, and the work lock control section 44 controls the work lock valves 36A, 36B, and so forth to the communication position. Driving of all hydraulic actuators for work is thereby permitted.

When the present amount of stored power of the battery device 19 is equal to or smaller than the threshold, the processing sequence proceeds to step S304, and the work lock control section 44 of the controller 37 controls the work lock valves 36A, 36B, and so forth to the interruption position. Driving of all hydraulic actuators for work is thereby prohibited. Then, the processing sequence proceeds to step S305, and the work lock control section 44 determines whether an instruction from the release switch 26 is input. When an instruction from the release switch 26 is not input, the processing sequence returns to step S302.

On the other hand, when an instruction from the release switch 26 is input, the work lock control section 44 of the controller 37 temporarily removes the prohibition of driving of all hydraulic actuators for work. Specifically, in step S306, the work lock control section 44 controls the work lock valves 36A, 36B, and so forth to the communication position. In addition, in step S307, the work lock control section 44 determines whether a predetermined period of time set in advance has elapsed from the input of the instruction from the release switch 26. Then, the work lock control section 44 controls the work lock valves 36A, 36B, and so forth to the communication position until the predetermined period of time elapses. After the predetermined period of time has elapsed, the work lock control section 44 returns to step S304 via step S302 and controls the work lock valves 36A, 36B, and so forth to the interruption position.

Operation and effects of the above-described present embodiment will be described. In the present embodiment, the controller 37 computes and stores the amount of consumed power of the motor 28 consumed during the period from the departure of the hydraulic excavator from the charging equipment to the arrival at the work site, based on the locations of the charging equipment and the work site input from the input device 39 and the location of the hydraulic excavator measured by the positioning device 40. The controller 37 subtracts the above-described amount of consumed power from the amount of stored power of the battery device 19 to compute the amount of power consumable at the work site, and computes the period of time for which operation is possible at the work site, based on the amount of power consumable at the work site, and causes the display device 24 to display the period of time for which operation is possible at the work site. Therefore, the operator does not need to estimate the operable time corresponding to the necessary amount of stored power of the battery device 19 for the hydraulic excavator to travel from the work site to the charging equipment and it suffices for the operator to pay attention only to the period of time for which operation is possible at the work site displayed by the display device 24. That is, if the operable time displayed by the display device 24 is equal to or longer than zero, the necessary amount of stored power of the battery device 19 for the hydraulic excavator to travel from the work site to the charging equipment can be secured, and the hydraulic excavator can travel from the work site to the charging equipment. Furthermore, the operator can consider the timing of charging of the battery device 19, that is, the timing of return from the work site to the charging equipment, based on a work plan at the work site and the operable period of time displayed by the display device 24. This can increase the operating time of the hydraulic excavator at the work site and enhance the work efficiency of the hydraulic excavator.

Furthermore, in the present embodiment, the controller 37 sets the threshold of the amount of stored power in such a manner that the threshold is larger than the amount of consumed power consumed during the period from the departure of the hydraulic excavator from the charging equipment to the arrival at the work site only by a predetermined value set in advance, and controls the work lock valves 36A, 36B, and so forth in such a manner as to prohibit driving of the hydraulic actuators for work when the amount of stored power of the battery device 19 has decreased to the threshold. AS a result, decrease in the amount of stored power of the battery device 19 is prevented, and therefore, the hydraulic excavator can travel from the work site to the charging equipment. Moreover, the controller 37 controls the work lock valves 36A, 36B, and so forth in such a manner as to temporarily remove the prohibition of driving of the hydraulic actuators for work when an instruction from the release switch 26 is input in the state in which driving of the hydraulic actuators for work is prohibited. As a result, for example, the posture of the work device 9 can be changed for travelling of the hydraulic excavator.

Figure 9:
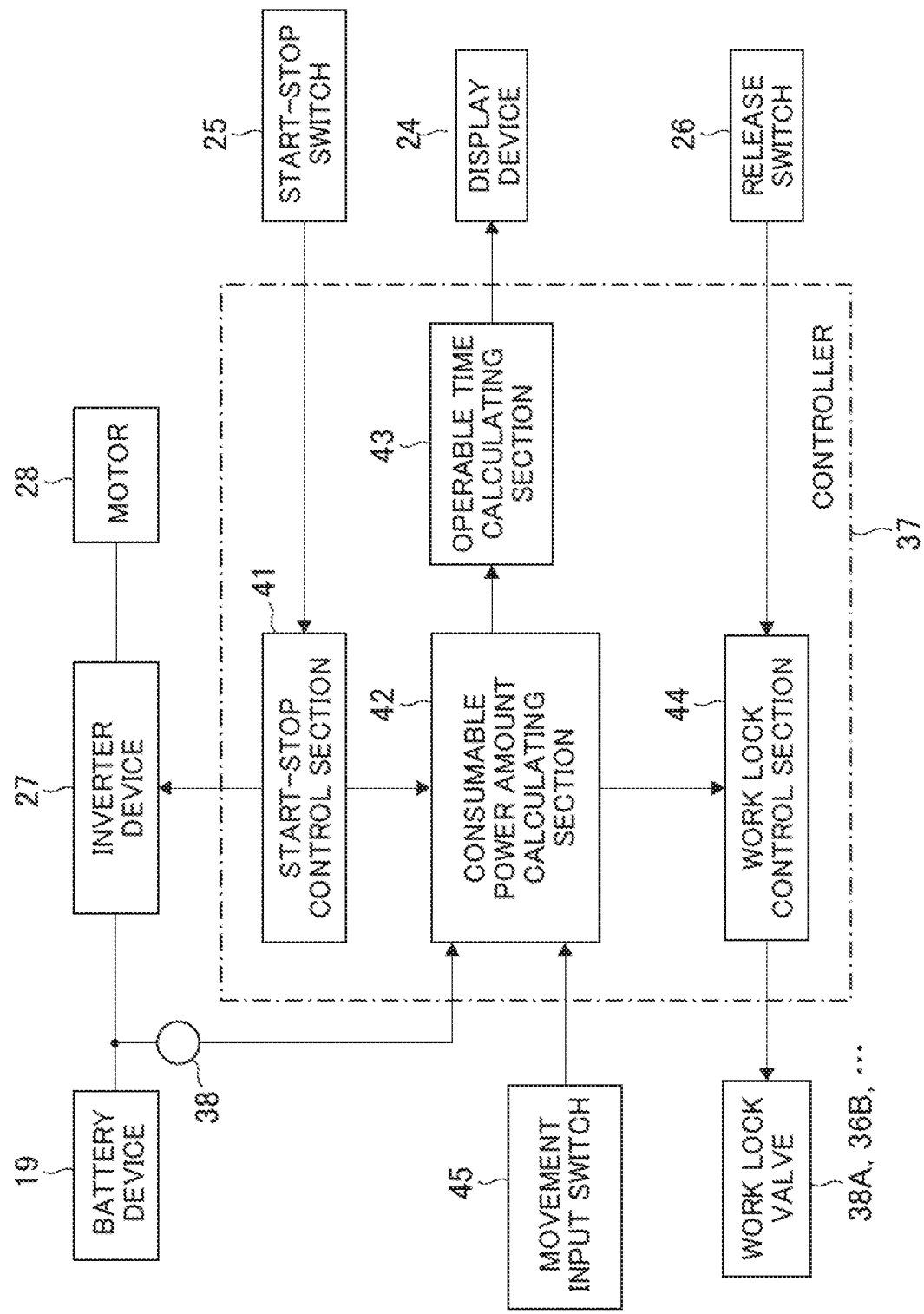
FIG. 9 is a diagram that represents the functional configuration of the controller in one modification example of the present invention together with related instruments.

In the above-described one embodiment, description is made by taking, as an example, the case in which the electric hydraulic excavator includes the input device 39 and the positioning device 40, as the movement information acquiring device, and the consumable power amount calculating section 42 of the controller 37 computes the amount of consumed power of the motor 28 consumed during the period from the departure of the hydraulic excavator from the charging equipment to the arrival at the work site, based on the locations of the charging equipment and the work site input from the input device 39 and the location of the hydraulic excavator measured by the positioning device 40. However, the present invention is not limited thereto, and modifications are possible in such a range as not to depart from the gist and technical idea of the invention. For example, as in a modification example depicted in FIG. 9, the electric hydraulic excavator may include, as the movement information acquiring device, a movement input switch 45 operated when the hydraulic excavator (self-machine) departs from the charging equipment and when the hydraulic excavator (self-machine) arrives at the work site. The consumable power amount calculating section 42 of the controller 37 may compute the amount of consumed power of the motor 28 consumed during the period from the departure of the hydraulic excavator from the charging equipment to the arrival at the work site, based on operation of the movement input switch 45. Also in such a modification example, the same effects as the above-described one embodiment can be obtained.

Furthermore, in the above-described one embodiment, description is made by taking, as an example, the case in which the work lock control section 44 of the controller 37 controls the work lock valves 36A, 36B, and so forth to the communication position until a predetermined period of time elapses from input of an instruction from the release switch 26 and controls the work lock valves 36A, 36B, and so forth to the interruption position after the predetermined period of time has elapsed. However, the present invention is not limited thereto, and modifications are possible in such a range as not to depart from the gist and technical idea of the present invention. For example, the work lock control section 44 of the controller 37 may control the work lock valves 36A, 36B, and so forth to the communication position only while an instruction from the release switch 26 is input, and may control the work lock valves 36A, 36B, and so forth to the interruption position when the input of the instruction from the release switch 26 is suspended. Alternatively, for example, the work lock control section 44 of the controller 37 may control the work lock valves 36A, 36B, and so forth to the communication position not only while an instruction from the release switch 26 is input but also when the input of the instruction is suspended. Also in such a modification example, the same effects as the above-described one embodiment can be obtained.

Moreover, in the above-described one embodiment, description is made by taking, as an example, the case in which plural work lock valves are provided for plural pilot lines relating to driving of all hydraulic actuators for work. However, the present invention is not limited thereto, and modifications are possible in such a range as not to depart from the gist and technical idea of the present invention. For example, plural work lock valves may be provided only for plural pilot lines relating to driving of the work device 9 (specifically, driving of the hydraulic cylinder for the swing, the hydraulic cylinder 14 for the boom, the hydraulic cylinder 15 for the arm, and the hydraulic cylinder 16 for the bucket). That is, the work lock control section 44 of the controller 37 may control plural work lock valves in such a manner as to prohibit only the driving of the work device 9 when the amount of stored power of the battery device 19 has decreased to the threshold. Also in such a modification example, the same effects as the above-described one embodiment can be obtained.

Furthermore, in the above-described one embodiment, description is made by taking, as an example, the case in which the work lock valves are provided for the pilot lines that are the secondary side of the operation device (specifically, pressure reducing valves). However, the present invention is not limited thereto, and modifications are possible in such a range as not to depart from the gist and technical idea of the present invention. For example, the work lock valves may be disposed on the primary side of the operation device (specifically, pressure reducing valves). Also in such a modification example, the same effects as the above-described one embodiment can be obtained.

Moreover, in the above-described one embodiment, description is made by taking, as an example, the case in which the operation device includes the pressure reducing valves that generate the pilot pressure corresponding to the amount of operation of the operation lever (or operation pedal). However, the present invention is not limited thereto, and modifications are possible in such a range as not to depart from the gist and technical idea of the present invention. For example, the operation device may include a potentiometer that generates an electrical signal corresponding to the amount of operation of the operation lever (or operation pedal) and outputs the electrical signal to the pressure reducing valve. In this modification example, a switch may be disposed on the primary side or secondary side of the potentiometer, as a work lock device. The work lock control section 44 of the controller 37 may control the above-described switch to the opened state to prohibit driving of the hydraulic actuators for work when the amount of stored power of the battery device 19 has decreased to the threshold, and may control the switch to the closed state to temporarily remove the prohibition of driving of the hydraulic actuators for work when an instruction from the release switch 26 is input. Also in such a modification example, the same effects as the above-described one embodiment can be obtained.

Furthermore, in the above-described one embodiment, description is made by taking, as an example, the case in which the electric hydraulic excavator includes the work lock devices and the release switch 26 and the controller 37 has the work lock control section 44. However, the present invention is not limited thereto and modifications are possible in such a range as not to depart from the gist and technical idea of the present invention. That is, although part of the above-described effects is not obtained, the electric hydraulic excavator does not have to include the work lock devices and the release switch 26 and the controller 37 does not have to have the work lock control section 44.

Moreover, in the above-described one embodiment, description is made by taking, as an example, the case in which the controller 37 has the start-stop control section 41. However, the present invention is not limited thereto, and modifications are possible in such a range as not to depart from the gist and technical idea of the present invention. For example, the controller 37 does not have to have the start-stop control section 41, and another controller having the start-stop control section may be provided.

In the above, description is made by taking, as an example, the case in which the present invention is applied to the electric hydraulic excavator. However, the present invention is not limited thereto, and the present invention may be applied to an electric hydraulic crane or the like for example.

DESCRIPTION OF REFERENCE CHARACTERS

7: Hydraulic motor for travelling
14: Hydraulic cylinder for the boom
15: Hydraulic cylinder for the arm
16: Hydraulic cylinder for the bucket
19: Battery device (power storage device)
24: Display device
26: Release switch
28: Motor
29: Hydraulic pump
36A, 36B: Work lock valve (work lock device)
37: Controller
39: Input device
40: Positioning device
45: Movement input switch

The invention claimed is:

1. An electric construction machine comprising:
a power storage device;
a motor driven by power of the power storage device;
a hydraulic pump driven by the motor;
a hydraulic motor for travelling and a hydraulic actuator for work that are driven by hydraulic fluid delivered from the hydraulic pump;
a controller; and
a display device, wherein
the electric construction machine further includes
a movement information acquiring device that acquires movement information of the construction machine,
the controller is configured to
compute and store an amount of consumed power of the motor consumed during a period from departure of the construction machine from charging equipment to arrival at a work site, based on the movement information of the construction machine acquired by the movement information acquiring device,
subtract the amount of consumed power from an amount of stored power of the power storage device to compute an amount of power consumable at the work site,
compute a period of time for which operation is possible at the work site, based on the amount of power consumable at the work site, and
cause the display device to display the period of time for which operation is possible at the work site.

2. The electric construction machine according to claim 1, wherein
the controller is configured to compute average power consumption per unit time based on the amount of consumed power of the motor consumed when the construction machine is operated at the work site, and divide the amount of power consumable at the work site by the average power consumption to compute the period of time for which operation is possible at the work site.

3. The electric construction machine according to claim 1, wherein
the movement information acquiring device includes an input device to input locations of the charging equipment and the work site and a positioning device that measures a location of the construction machine, and
the controller is configured to compute the amount of consumed power of the motor consumed during the period from the departure of the construction machine from the charging equipment to the arrival at the work site, based on the locations of the charging equipment and the work site input from the input device and the location of the construction machine measured by the positioning device.

4. The electric construction machine according to claim 1, wherein
the movement information acquiring device is a movement input switch operated when the construction machine departs from the charging equipment and when the construction machine arrives at the work site, and
the controller is configured to compute the amount of consumed power of the motor consumed during the period from the departure of the construction machine from the charging equipment to the arrival at the work site, based on operation of the movement input switch.

5. The electric construction machine according to claim 1, wherein
the electric construction machine includes
a work lock device that carries out switching between permission and prohibition of driving of the hydraulic actuator for work, and
a release switch to input an instruction for removing prohibition of the driving of the hydraulic actuator for work, and
the controller is configured to
set a threshold of the amount of stored power in such a manner that the threshold is larger than the amount of consumed power consumed during the period from the departure of the construction machine from the charging equipment to the arrival at the work site only by a predetermined value set in advance,
control the work lock device in such a manner as to prohibit the driving of the hydraulic actuator for work when the amount of stored power of the power storage device has decreased to the threshold, and
after the prohibition, control the work lock device in such a manner as to remove the prohibition of the driving of the hydraulic actuator for work when an instruction from the release switch is input.

6. The electric construction machine according to claim 5, wherein
the controller is configured to control the work lock device in such a manner as to permit the driving of the hydraulic actuator for work until a predetermined period of time set in advance elapses from the input of the instruction from the release switch, and control the work lock device in such a manner as to prohibit the driving of the hydraulic actuator for work, after the predetermined period of time has elapsed.

* * * * *